May 15, 1928.
K. M. HOLT
1,670,070
POWER INSTALLATION
Filed July 7, 1923
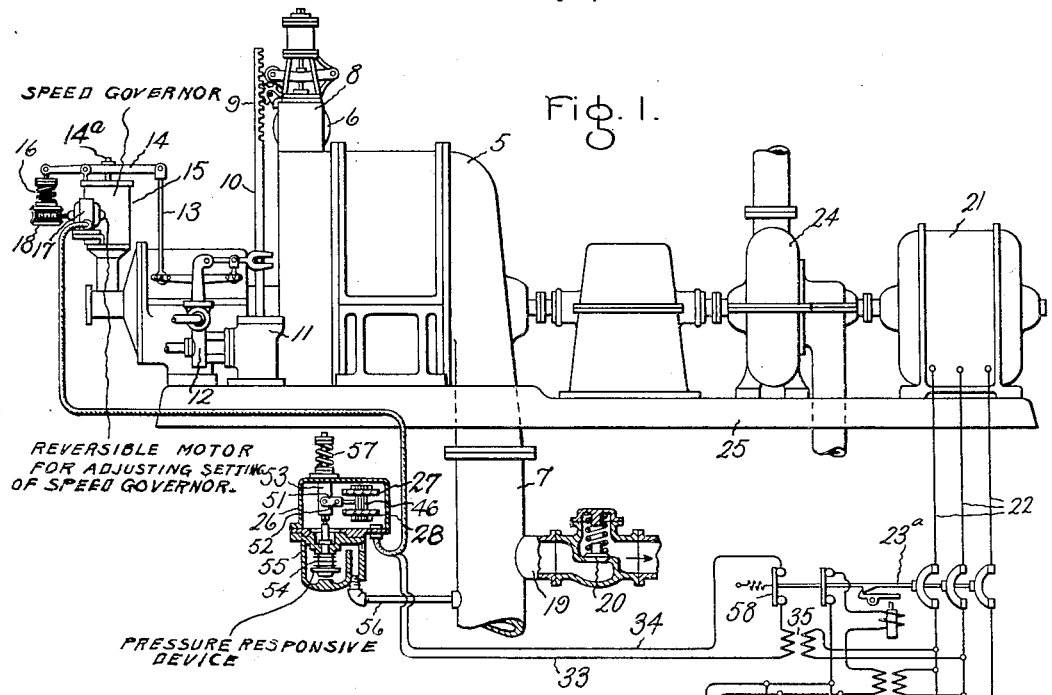
Fig. 1.
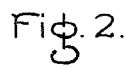
Fig. 2.
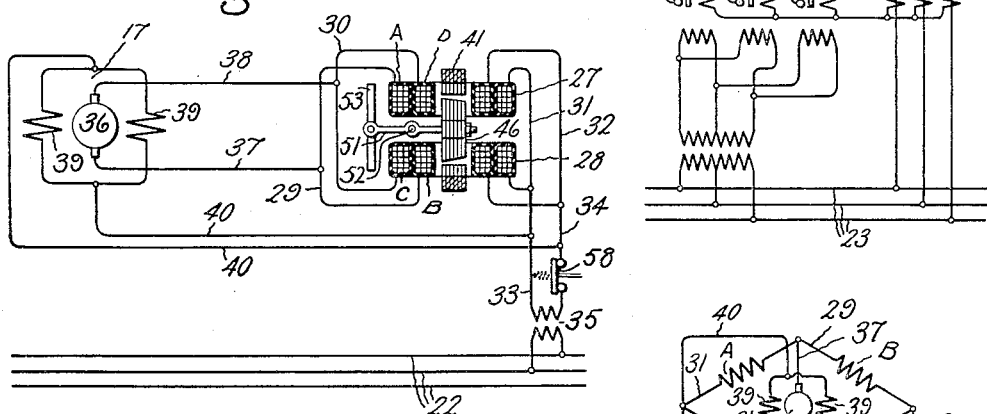
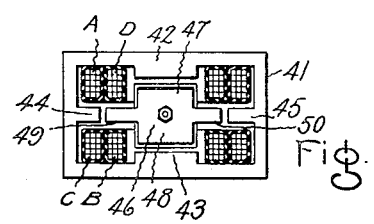
Fig. 3.
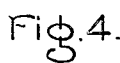
Fig. 4.
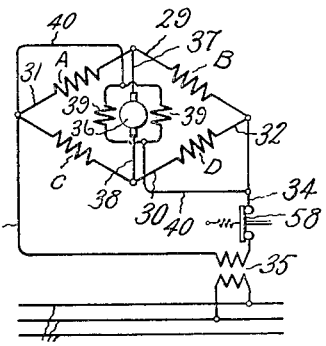
Inventor:
Klate M. Holt,
by Alexander S. Lunt
His Attorney.

Patented May 15, 1928.

1,670,070

UNITED STATES PATENT OFFICE.

KLATE M. HOLT, OF LYNN, MASSACHUSETTS, ASSIGNOR TO GENERAL ELECTRIC COMPANY, A CORPORATION OF NEW YORK.

POWER INSTALLATION.

Application filed July 7, 1926. Serial No. 121,015.

The present invention relates to power installations and especially to power installations comprising an elastic fluid turbine and an alternating current dynamo-electric machine mechanically connected together, the dynamo-electric machine being connected to the main alternating current bus-bars which serve to fix the speed of the dynamo-electric machine and the turbine being governed by an operating condition other than its speed, such as, for example, the pressure in its exhaust conduit.

In connection with such installations, it is the practice to provide the elastic fluid turbine with a speed governor, and also with a governor responsive to an operating condition other than its speed, the turbine being normally under control of the latter governor.

The object of the present invention is to provide in connection with such a power installation an arrangement whereby in case the connections between the dynamo-electric machine and the main bus bars are disrupted, the governor responsive to the condition other than the speed of the set will be automatically put out of service, the turbine then being placed directly under control of its speed governor.

One application of my invention is in connection with what are termed usually three-unit sets and wherein such sets comprise an elastic fluid turbine and an alternating current motor, the motor serving to fix the speed of the set by reason of its connection to the source of alternating current supply and the turbine having means for regulating the supply of elastic fluid thereto in response to an operating condition other than its speed. It is to be understood, however, that my invention is not limited to this application.

In the embodiment illustrated in the drawing, the invention is shown as being carried out in connection with a three-unit set wherein the turbine element is a back pressure turbine which supplies elastic fluid for industrial purposes. In such a set, during normal operation, the turbine is governed by means of a back pressure governor which causes the turbine to carry sufficient load to maintain the pressure in its exhaust conduit at a desired value which means that the turbine is carrying sufficient load to supply enough exhaust steam to meet the demand for exhaust steam. The remainder of the load is then carried by the electric motor. The utility of three-unit sets of this type is well understood in the art and it is accordingly unnecessary to enumerate the advantages thereof in detail.

In connection with three-unit sets, it may happen that the supply of electric power to the motor fails and when this occurs, it is desirable to have the turbine carry the entire load of the three-unit set. However, the turbine being equipped with a back pressure governor, it would normally tend to take only sufficient load to supply the demand for low pressure steam. Under these circumstances, therefore, the turbine would not take up the load formerly carried by the motor before its power supply failed.

In connection with a three-unit set of the type referred to above, my invention is utilized to cause the turbine to be placed directly under control of its speed governor in case the supply of power to the motor fails, so that the turbine will then carry the entire load formerly carried by both the turbine and the motor.

For a consideration of what I believe to be novel and my invention, attention is directed to the accompanying description and the claims appended thereto.

In the drawing, which illustrates one embodiment of my invention, Fig. 1 is a side elevation of a three-unit set provided with a governing mechanism embodying the invention; Fig. 2 is a view partly diagrammatic of the back pressure governor; Fig. 3 is a detail view of a part of the back pressure governor, and Fig. 4 is a wiring diagram of the construction shown in Fig. 2.

Referring to the drawing, 5 indicates a steam turbine having an admission conduit 6 and an exhaust conduit 7. Admission of the elastic fluid to turbine 5 is controlled by a valve mechanism 8 of any suitable construction actuated by a rack 9 on the upper end of a rod 10. Rod 10 is connected to a fluid-actuated motor 11 controlled by a pilot valve 12, the pilot valve being connected by a link 13 to a governor lever 14 pivoted at 14ª. Connected to the governor lever is a speed governor 15 of any suitable type. Connected to the end of lever 14 is a spring 16, the tension of which may be adjusted by an electric motor 17 in order to change the setting of the governor, the motor being connected to the spring through a suitable worm gearing 18. When motor 17 is operated in one direction it serves to increase the tension of spring 16, and when operated in the other direction it serves to decrease the tension of spring 16, thereby changing the setting of the governor in the well-understood manner. A motor-operated spring mechanism of this character is termed usually a synchronizing mechanism for the turbine. The arrangement illustrated is shown only diagrammatically and by way of example, and is to be taken as typical of any suitable motor-operated means for adjusting the setting of a speed governor controlling the admission of elastic fluid to a turbine.

Exhaust conduit 7 supplies elastic fluid for industrial purposes, the elastic fluid being conveyed to any suitable point where it is to be utilized. For example, it may be used for heating, cooking, drying or the like, as is well understood.

Connected to conduit 7 is a branch conduit 19 containing a suitable pressure relief valve 20, the arrangement being such that when the pressure in the conduit 7 exceeds a certain predetermined high value, relief valve 20 will open automatically to permit of the escape of elastic fluid directly to the atmosphere. 21 indicates a synchronous three-phase motor connected by lead wires 22 to a suitable source of three-phase alternating current 23. In lead wires 22 is a switch 23$^a$ of any suitable type, which is opened automatically in case the supply of current to motor 21 fails. In the present instance, a reverse current switch is illustrated, the same being opened in case of current flow from synchronous motor 21 back toward the supply mains 23. It may be of any type, a known type being indicated diagrammatically in the drawing. 24 indicates the driven element of the three-unit set, the same being shown in the present instance as a pump. The turbine, synchronous motor and pump all have their shafts connected together and all three elements are mounted on a common bed plate 25.

26 indicates generally a back pressure governor which is actuated by variations in pressure in exhaust conduit 7, and which serves to effect operation of motor 17 to effect a further opening of the turbine valve mechanism when the pressure in conduit 7 decreases and to effect a closing of such valve mechanism when the pressure in conduit 7 increases, whereby it serves to maintain the pressure in conduit 7 substantially constant. In the present instance I have illustrated a back pressure governor of the type shown in the patent to Reginald G. Standerwick, No. 1,593,659 granted July 27, 1926. It comprises two sets of coils 27 and 28, each set comprising two windings exactly alike in all respects and wound superimposed one on the other. The two windings of set 27 are designated A and D and the two windings of set 28 are designated B and C. The winding A of set 27 is connected to the winding B of set 28 by a conductor 29 and the winding D of set 27 is connected to the winding C of set 28 by a conductor 30. The other terminals of windings A and C are connected together by a conductor 31 and the other terminals of windings B and D are connected together by a conductor 32. Conductors 31 and 32 are connected to two of the lead wires 22 by conductors 33 and 34, the connections including a potential transformer 35. Windings A and B are connected thus in series to the two lead wires 22 and windings C and D are connected likewise in series to such lead wires; and windings A, B are parallel to windings C, D. Armature 36 of motor 17 is connected by conductors 37 and 38 to conductors 29 and 30, it being connected thus between windings A, B and windings C, D. The arrangement of the connections will be clear from the wiring diagram, Fig. 4. The field winding 39 of motor 17 is connected by lead wires 40 to lead wires 34 and 35.

Considering the wiring diagram, it will be clear that when the ratio of the impedance of winding A to the impedance of winding B equals the ratio of the impedance of winding C to the impedance of winding D, no current will flow through armature 36, but that when this condition does not obtain current will flow through armature 36 in one direction or the other, depending upon the direction and amount of the unbalance. This is the well known Wheatstone bridge arrangement.

In connection with the two sets of coils 27 and 28, there is arranged a core structure which provides magnetic circuits for the windings. The core structure comprises a stationary rectangular yoke 41 formed of suitable laminations and provided with four inwardly projecting poles 42, 43, 44 and 45. The two sets of coils are arranged in this yoke. In the center of the yoke is a movable plunger 46 formed of suitable laminations and having four poles 47, 48, 49 and 50, which approach poles 42, 43, 44 and 45. Plunger 46 is carried on one end of a lever 51 fulcrumed at 52, the other end being connected to a rod 53. By moving lever 51 on its fulcrum the widths of the air gaps between pole faces 42 and 47 and between pole faces 43 and 48 are varied. The faces of pole pieces 47 and 48 are beveled to an extent such that when brought up to the faces of pole pieces 42 and 43 they are then parallel to them. The widths of the air gaps between pole faces 44 and 49 and between pole faces 45 and 50 remain constant and are made as small as practical. The four coils, A, B, C and D, are similar in design in every respect, coils A and D being wound superimposed, and coils B and C being wound superimposed, and they are wound in directions such that the flux due to each is a common direction. The lower end of rod 53 is connected to a collapsible bellows 54 mounted in a casing 55, which is connected to exhaust conduit 7 by a pipe 56. Movement of bellows 54 is opposed by an adjustable loading spring 57. When the pressure in conduit 7 changes such pressure acting on the bellows causes it to expand or contract, thereby moving lever 51 and plunger 46.

When plunger 46 is exactly in the center of yoke 41, the air gaps between pole pieces 42 and 47 and between pole pieces 43 and 48 are equal, and since all the windings are similar and are wound in a direction such that the flux due to each is in a common direction, there will result a magnetic field common to all four windings. This field will travel through yoke 41 and pole pieces 42, 47, 48 and 43, no flux passing through pole pieces 44, 49, 50 and 45. With this condition obtaining, the impedance of all the coils A, B, C and D will be the same and no current will flow through motor armature 36. As a result, the motor will be stationary. The design of the windings and core structure is such that under these conditions, i. e., zero potential on armature 36, but a small amount of power will be consumed in the windings. This may be accomplished by designing the structure so that the power factor, with zero potential on armature 36, is of low value.

If now the pressure in conduit 7 changes so that plunger 46 is moved to decrease the width of the air gap between pole pieces 42 and 47 and to increase the width of the air gap between pole pieces 48 and 43, the magnetic circuits will become unbalanced since the reluctance of the magnetic path for windings A, D will have been decreased and that for windings B, C increased. As a result, the flux created by windings A, D will be increased and that created by windings B, C will be decreased, the increased flux due to windings A, D now passing through pole pieces 44, 49, 50 and 45. It follows, therefore, that the reactance of both windings A and D is increased and the reactance of both windings B and C is decreased. The Wheatstone bridge thus becomes unbalanced, whereby a potential will be placed on motor armature 36 causing it to rotate in one direction. If plunger 46 is moved in the other direction from its neutral or central position, the same effect takes place except that the unbalancing is in the other direction and the motor armature is caused to run in the other direction. Thus by moving plunger 46 one way from central position the motor is operated in one direction and by moving plunger 46 the other way from central position, the motor is operated in the other direction, since the field is in a relatively constant direction. The amount of unbalance of the Wheatstone bridge, and hence the value of the potential imposed on motor armature 36, varies directly with the amount which the plunger 46 is moved. Any motor speed in either direction from a very slow creeping movement to maximum speed can be obtained by gradually moving the plunger.

When plunger 46 is moved, the reactance of all four windings is changed, the reactance of windings A and D being changed in a direction always opposite to that of windings B and C. This means that a maximum increase in the unbalance of the bridge takes place for each increment of movement of the plunger. As a result, the motor may be operated over a wide speed range with a comparatively small total movement of the plunger.

Thus it will be seen that when the pressure in conduit 7 increases or decreases the governor spring 16 will be adjusted in one direction or the other to cause turbine 5 to take elastic fluid sufficient to maintain the pressure in conduit 7 substantially constant, and hence to supply the demand for industrial elastic fluid. The remainder of the load represented by pump 24 is then carried by motor 21.

In circuit connections 33 and 34 is a switch 58 connected with the reverse current circuit breaker 23ª, the arrangement being such that when the reverse current circuit breaker operates to open the circuit of motor 21, it opens also switch 58.

When the set is running normally, switches 23ª and 58 are closed and the turbine is under the control of the back pressure governor 26. The turbine is regulated by the back pressure governor so that it carries load sufficient to maintain the pressure in conduit 7 substantially constant. The remainder of the load is carried by motor 21. If now for any reason the supply of power to motor 21 fails, motor 21, being a synchronous motor, will tend to run as a generator driven by turbine 5 and to deliver current to supply mains 23. When this occurs, reverse current switch 23ª is automatically opened as is also switch 58. The opening of switch 58 serves to cut off the supply of current to the back pressure governor and hence to render it inoperative. Speed governor 15 then takes control of the turbine, the turbine taking over the entire load on the set, motor 21 running idly and the excess of exhaust elastic fluid being discharged through pressure relief valve 20. The speed governor will assume control at the setting of spring 16 which obtains at the time switch 58 opens which may be anything between the setting for fully closed position and the setting for fully open position of valve means 6. However, as the range of a speed governor between full load and no load is relatively small, the setting of the governor spring 16 at the time the governor assumes control is not a matter of importance. After the speed governor has assumed control of the turbine, the spring 16 may be adjusted manually if found desirable. This condition of operation will obtain until the supply of current to motor 21 is restored, switches 23ᵃ and 58 being closed, when the turbine will be placed again under control of the back pressure governor.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:—

1. In a power installation comprising an elastic fluid turbine, an electric motor, and a driven machine, the combination of a speed governor for the turbine, a back pressure governor for the turbine, said back pressure governor normally controlling the supply of elastic fluid to the turbine, means for supplying current to said motor, and means whereby said back pressure governor is rendered inoperative when the supply of current to the electric motor fails whereupon said speed governor assumes control of the turbine.

2. In a power installation comprising an elastic fluid turbine, an electric motor, and a driven machine, the combination of a speed governor for the turbine, a back pressure governor for the turbine, said back pressure governor normally controlling the supply of elastic fluid to the turbine, an electric switch controlling the supply of current to said motor, and means whereby said back pressure governor is rendered inoperative when said switch is opened whereupon said speed governor assumes control of the turbine.

3. The combination with a turbine and an electric motor connected to a common load, of a speed governor for the turbine, control means responsive to an operating condition of the turbine other than its speed for normally regulating the turbine, and means whereby said control means is rendered inoperative when the supply of current to the electric motor fails whereupon said speed governor assumes control of the turbine.

4. The combination with a turbine and an electric motor connected to a common load, of a speed governor for the turbine, control means responsive to an operating condition of the turbine other than its speed for normally regulating the turbine, said control means being electrically operated, and means whereby the supply of current to said control means is interrupted when the supply of current to the electric motor fails whereupon said speed governor assumes control of the turbine.

5. The combination with a turbine and an electric motor connected to a common load, of a speed governor for the turbine, a second electric motor for adjusting the setting of the speed governor, means responsive to the pressure in the exhaust conduit of the turbine for adjusting said second electric motor to regulate normally the load carried by the turbine, and means whereby said pressure responsive means is rendered inoperative when the supply of power to the first-named electric motor fails whereupon said speed governor assumes control of the turbine.

6. The combination with a turbine and an electric motor connected to a common load, of a speed governor for the turbine, a second electric motor for adjusting the setting of the speed governor, an electrically operated device for effecting adjustment of said second electric motor, means responsive to the pressure in the exhaust conduit of the turbine controlling said electrically-operated device, and means for cutting off the supply of current to said electrically-operated device when the supply of current to said first-named motor fails whereupon said speed governor assumes control of the turbine.

7. The combination with an elastic fluid turbine and a dynamo-electric machine connected to a common shaft, of a speed governor for the turbine, control means responsive to an operating condition of the turbine other than its speed for normally regulating the turbine, power connections for the dynamo-electric machine, and means whereby said control means is rendered inoperative when said power connections for the dynamo-electric machine are disrupted whereupon said speed governor assumes control of the turbine.

8. The combination with an elastic fluid turbine and a dynamo-electric machine connected to a common shaft, of a speed governor for the turbine, control means responsive to an operating condition of the turbine other than its speed for normally regulating the turbine, said control means being electrically operated, power connections for the dynamo-electric machine, and means whereby the supply of current to said control means is interrupted when the power connections for the dynamo-electric machine are disrupted whereupon said speed governor assumes control of the turbine.

9. The combination with an elastic fluid turbine and a dynamo-electric machine connected to a common shaft, of a speed governor for the turbine, regulating valve means for the turbine, means responsive to the pressure in the exhaust conduit of the turbine for normally positioning said valve means, and means whereby said pressure-responsive means is rendered inoperative when the power connections to the dynamo-electric machine are disrupted whereupon said speed governor assumes control of the turbine.

10. The combination of a turbine, an alternating current dynamo-electric machine connected to the turbine, alternating current bus bars to which the dynamo-electric machine is electrically connected and which serve to fix the speed of the dynamo-electric machine and turbine, valve means for the turbine, a speed governor means and a means responsive to an operating condition other than the speed of the turbine for positioning said valve means, said other means being normally in control of the turbine, and means for rendering said other means inoperative when the dynamo-electric machine is disconnected from said bus bars whereby the speed governor assumes control of the turbine.

11. In a power installation comprising an elastic fluid turbine, a dynamo-electric machine connected to the turbine, and alternating current bus bars to which the dynamo-electric machine is connected, the combination of a speed governor for the turbine, a second governing means for the turbine, said second governing means normally controlling the supply of elastic fluid to the turbine, and means whereby said second governing means is rendered inoperative when the connections between the dynamo-electric machine and bus bars are disrupted whereupon said speed governor assumes control of the turbine.

12. In a power installation, the combination of an elastic fluid turbine, a dynamo-electric machine driven by the turbine, power lines, means, including an electric switch for connecting the dynamo-electric machine to the power lines, valve means for the turbine, a speed governor and a means responsive to a condition of operation other than the speed of the turbine for positioning said valve means, and means whereby the latter is rendered inoperative when said switch is opened whereupon said speed governor assumes control of the turbine.

In witness whereof, I have hereunto set my hand this 3rd day of July, 1926.

KLATE M. HOLT.